(12) United States Patent
Zeng et al.

(10) Patent No.: US 10,701,576 B2
(45) Date of Patent: Jun. 30, 2020

(54) RADIO LINK MONITORING METHOD, RELATED DEVICE, AND SYSTEM

(71) Applicant: HUAWEI TECHNOLOGIES CO., LTD., Shenzhen (CN)

(72) Inventors: Qinghai Zeng, Shanghai (CN); Jian Zhang, Shenzhen (CN); Qiang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/907,301

(22) Filed: Feb. 28, 2018

(65) Prior Publication Data

US 2018/0192311 A1    Jul. 5, 2018

Related U.S. Application Data

(63) Continuation of application No. PCT/CN2015/088459, filed on Aug. 29, 2015.

(51) Int. Cl.
   *H04W 24/08*    (2009.01)
   *H04W 16/10*    (2009.01)
   (Continued)

(52) U.S. Cl.
   CPC ........... *H04W 24/08* (2013.01); *H04W 16/14* (2013.01); *H04W 36/06* (2013.01); *H04W 36/16* (2013.01);
   (Continued)

(58) Field of Classification Search
   CPC ... H04W 16/14; H04W 28/18; H04W 72/042; H04W 72/0446; H04W 74/0808;
   (Continued)

(56) References Cited

U.S. PATENT DOCUMENTS

2013/0061298 A1    3/2013 Longobardi et al.
2013/0143502 A1    6/2013 Kazmi et al.
(Continued)

FOREIGN PATENT DOCUMENTS

CN    1885753 A    12/2006
CN    102104961 A    6/2011
(Continued)

OTHER PUBLICATIONS

Nokia Networks,"RLM for LTE-WLAN aggregation",3GPP TSG-RAN WG2 Meeting #91 R2-153138,Aug. 24-28, 2015,total 4 pages.
(Continued)

*Primary Examiner* — Michael Thier
*Assistant Examiner* — Prince A Mensah
(74) *Attorney, Agent, or Firm* — Kilpatrick Townsend & Stockton LLP (57) ABSTRACT

Embodiments of the present invention disclose a radio link monitoring method, including: contending, by a base station, for permission of use of an unlicensed frequency band; and sending, by the base station, statistical information of the permission of use of the unlicensed frequency band to user equipment after the permission of use of the unlicensed frequency band is obtained by means of contention, where the statistical information indicates data that is obtained after statistics collection is performed on the permission of use of the unlicensed frequency band according to a preset statistical method, so that the user equipment determines whether a radio link fails. The embodiments of the present invention further disclose a related base station, user equipment, and a communications system. The embodiments of the present invention can improve service quality of the unlicensed frequency band.

14 Claims, 5 Drawing Sheets

```
┌─────────────────────────────────────────────────────────┐
│ A base station contends for permission of use of an     │  S201
│                unlicensed frequency band                │
└─────────────────────────────────────────────────────────┘
                            │
                            ▼
┌─────────────────────────────────────────────────────────┐
│ The base station sends statistical information of the   │
│ permission of use of the unlicensed frequency band to   │
│ user equipment after obtaining the permission of use of │  S202
│ the unlicensed frequency band by means of contention,   │
│ where the statistical information indicates data that is│
│ obtained after statistics collection is performed on the│
│ permission of use of the unlicensed frequency band      │
│ according to a preset statistical method, so that the   │
│ user equipment determines whether a radio link fails    │
└─────────────────────────────────────────────────────────┘
```

(51) Int. Cl.
| | |
|---|---|
| *H04W 36/16* | (2009.01) |
| *H04W 36/06* | (2009.01) |
| *H04W 16/14* | (2009.01) |
| *H04W 74/00* | (2009.01) |
| *H04W 48/08* | (2009.01) |
| *H04W 72/04* | (2009.01) |
| *H04W 24/02* | (2009.01) |
| *H04W 88/06* | (2009.01) |

(52) U.S. Cl.
CPC ........... *H04W 48/08* (2013.01); *H04W 72/04* (2013.01); *H04W 74/006* (2013.01); *H04W 24/02* (2013.01); *H04W 88/06* (2013.01)

(58) Field of Classification Search
CPC ..... H04W 24/02; H04W 24/08; H04W 36/06; H04W 36/16; H04W 48/08; H04W 72/04; H04W 74/006; H04W 88/06
See application file for complete search history.

(56) References Cited

U.S. PATENT DOCUMENTS

| | | | |
|---|---|---|---|
| 2013/0195073 A1 | 8/2013 | Chen et al. | |
| 2014/0378157 A1* | 12/2014 | Wei | H04W 16/14 455/454 |
| 2015/0055588 A1* | 2/2015 | Yerramalli | H04W 72/0446 370/329 |
| 2015/0245411 A1 | 8/2015 | Damnjanovic et al. | |
| 2015/0263837 A1* | 9/2015 | Patel | H04L 27/0006 370/329 |
| 2015/0350949 A1* | 12/2015 | Wang | H04W 16/14 370/230 |
| 2016/0066195 A1* | 3/2016 | Moon | H04W 16/14 455/454 |
| 2016/0095120 A1* | 3/2016 | Gaal | H04L 5/0007 370/329 |
| 2017/0063517 A1* | 3/2017 | Liao | H04W 74/0808 |
| 2017/0280331 A1 | 9/2017 | Gou et al. | |
| 2018/0279211 A1* | 9/2018 | Lunttila | H04W 48/16 |

FOREIGN PATENT DOCUMENTS

| | | |
|---|---|---|
| CN | 102843696 A | 12/2012 |
| CN | 103069882 A | 4/2013 |
| CN | 104301273 A | 1/2015 |
| EP | 3091773 A1 | 11/2016 |
| WO | 2015105440 A1 | 7/2015 |
| WO | 2015109571 A1 | 7/2015 |

OTHER PUBLICATIONS

Huawei, HiSilicon,"WLAN link monitoring and failure report for LTE-WLAN aggregation and interworking enhancement",3GPP TSG-RAN WG2 Meeting #91 R2-153557,Aug. 24-28, 2015,total 2 pages.

* cited by examiner

RADIO LINK MONITORING METHOD, RELATED DEVICE, AND SYSTEM

CROSS-REFERENCE TO RELATED APPLICATIONS

This application is a continuation of International Application No. PCT/CN2015/088459, filed on Aug. 29, 2015, the disclosure of which is hereby incorporated by reference in its entirety.

TECHNICAL FIELD

Embodiments of the present invention relate to the communications field, and in particular, to a radio link monitoring method, a related device, and a system.

BACKGROUND

With rapid development of a packet service and an intelligent terminal, a high-speed service with a large data amount has an increasing requirement for a spectrum. According to the latest released FCC international spectrum white paper, unlicensed spectrum resources are more than licensed spectrum resources. Unlicensed spectrums include frequency bands used for devices in industrial, scientific and medical (ISM, Industrial, Scientific and Medical) fields and the like. For example, there are three frequency bands in the United States: 902-928 MHz, 2400-2484.5 MHz, and 5725-5850 MHz; and a frequency band of 2.4 GHz is an ISM frequency band common to all countries. Technologies used on an ISM frequency band mainly include wireless fidelity (WiFi, Wireless Fidelity), wireless local area network (WLAN, wireless local network), Bluetooth, and Zigbee (Zigbee), and the like. WiFi is based on the Institute of Electrical and Electronics Engineers (IEEE, Institute of Electrical and Electronics Engineers) 802.11 family of standards, such as 802.11a, 802.11n, and 802.11ac. WiFi has relatively low efficiency in terms of quality of service (QoS, quality of service), multi-user scheduling (scheduling), or the like, and a mobility management (mobility management) function is limited.

Figure 1A:
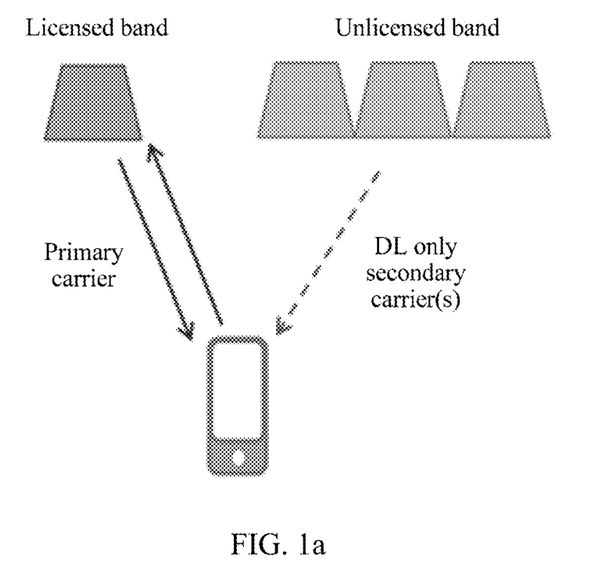
FIG. 1a is a connection schematic diagram when user equipment is configured as LAA dual connectivity.
Figure 1B:
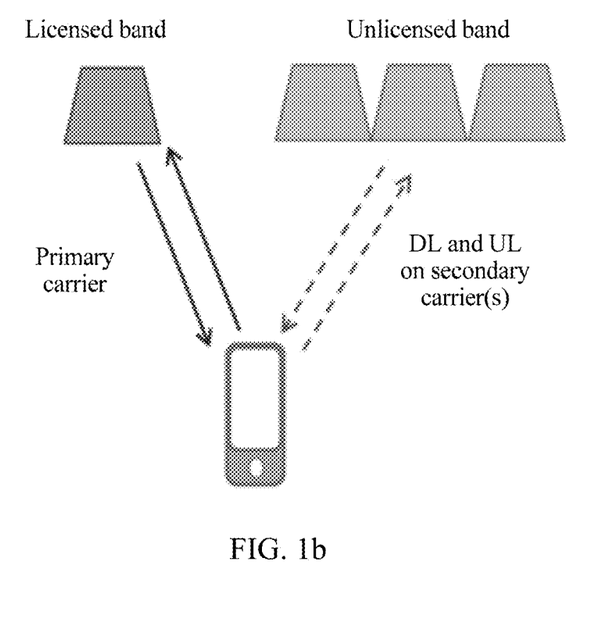
FIG. 1b is another connection schematic diagram when user equipment is configured as LAA dual connectivity.

A licensed-assisted access (LAA, licensed assisted access) of a Long Term Evolution Advanced (LTE-A, Long Term Evolution Advanced) research project of the 3rd Generation Partnership Project (3GPP, the 3rd generation partnership project) is studying to apply an LTE-A cellular communications technology on an unlicensed frequency band, so as to use the unlicensed frequency band resources more effectively, and increase an available spectrum bandwidth of an LTE user. As shown in FIG. 1a and FIG. 1b, the LAA is based on a scenario in which carrier aggregation (CA, Carrier Aggregation) is performed on a licensed spectrum and an unlicensed frequency band. A carrier on the licensed spectrum is used as a primary serving cell (PCell, Primary cell), and a carrier on the unlicensed frequency band is used as a secondary cell (SCell, Secondary Cell). The PCell and the SCell in the LTE-A CA may use a collocation site (collocate or co-site) or non-collocation sites. For example, when non-collation sites are used, an evolved NodeB (eNB) and a remote radio head (RRH, Remote Radio Head) respectively provide the PCell and the SCell. The PCell is a cell (cell) that initially accesses a system when user equipment (UE, User Equipment) performs a random access procedure (random access procedure), or a cell that accesses a target base station when user equipment performs a handover procedure (handover procedure). The PCell further provides security (security) and non-access stratum (NAS, Non-Access Stratum) signaling transmission. The SCell mainly provides additional radio resources for data transmission.

LTE-A dual connectivity (DC, Dual Connectivity) indicates that carriers that are used for carrier aggregation for the UE are provided by different base stations. The UE can simultaneously or separately communicate with two base stations, so as to improve a peak rate and a throughput at a cell edge. Generally, a connection between base stations is a non-ideal backhaul link (backhaul), that is, message exchange between base stations requires a specific delay, and a limitation is also imposed on a capacity. Base stations participating in the LTE-A DC include a master eNodeB (MeNB, Master eNB) and a secondary eNodeB (SeNB, Secondary eNB). The master eNodeB provides the PCell, and optionally, provides another SCell. The secondary eNodeB provides a primary secondary cell (PSCell, Primary Secondary Cell), and the PSCell supports a physical uplink control channel (PUCCH, Physical Uplink Control Channel), and optionally, supports another SCell. The master eNodeB provides the UE with a base station connected to an S1-mobility management entity (S1-MME) interface. The secondary eNodeB is mainly configured to provide additional radio resources for data transmission.

In a case of performing carrier aggregation on a licensed LTE cell and an unlicensed LTE cell configured on a terminal, the terminal does not perform radio link monitoring on the unlicensed LTE cell. When the terminal is configured to independently use the unlicensed LTE cell, or the terminal is configured to perform inter-base station dual connectivity on the licensed LTE cell and the unlicensed LTE cell, if the terminal does not perform radio link monitoring on the unlicensed LTE cell, the following problem cannot be found in a timely manner: a radio channel of the unlicensed LTE cell cannot provide the terminal with a transmission service due to deterioration, and consequently, communication quality of the terminal is reduced and even interrupted, and user experience is seriously affected.

SUMMARY

A technical problem to be resolved in embodiments of the present invention is how to perform radio link monitoring on an unlicensed frequency band cell to improve system quality of user equipment. The embodiments of the present invention provide a method for performing radio link monitoring on an unlicensed frequency band cell, so as to resolve a prior-art problem that the radio link monitoring cannot be performed on the unlicensed frequency band cell.

To resolve the foregoing technical problem, a first aspect of the embodiments of the present invention provides a radio link monitoring method, including:

contending, by a base station, for permission of use of an unlicensed frequency band; and sending, by the base station, statistical information of the permission of use of the unlicensed frequency band to user equipment after the permission of use of the unlicensed frequency band is obtained by means of contention, where the statistical information indicates data that is obtained after statistics collection is performed on the permission of use of the unlicensed frequency band according to a preset statistical method, so that the user equipment determines whether a radio link fails.

With reference to the first aspect, in a first possible implementation, the statistical information indicates a quantity of cumulative times of obtaining the permission of use of the unlicensed frequency band by means of contention from a start moment to a moment of obtaining the permission of use of the unlicensed frequency band by means of contention, and the quantity of cumulative times is a loop count value in an agreed value range; or the statistical information indicates cumulative duration in which the permission of use of the unlicensed frequency band is obtained by means of contention from a start moment to the current moment, and the cumulative duration is a loop count value in an agreed value range; or the statistical information indicates information about a ratio of cumulative duration in which the permission of use of the unlicensed frequency band is obtained by means of contention from a start moment to the current moment to total duration from the start moment to the current moment, where the start moment is a moment at which the base station contends for the permission of use of the unlicensed frequency band for the first time, or a start moment of a time interval with an agreed period.

With reference to the first possible implementation of the first aspect, in a second possible implementation, the sending, by the base station, statistical information of the permission of use of the unlicensed frequency band to user equipment after the permission of use of the unlicensed frequency band is obtained by means of contention further includes:

sending, by the base station, identification information of the time interval with the agreed period to the user equipment.

With reference to any one of the first aspect, or the first or the second possible implementation, in a third possible implementation, the method further includes:

sending, by the base station, an available indication message to the user equipment, where the available indication message is used to indicate that an unlicensed frequency band cell corresponding to the unlicensed frequency band switches from an unavailable state to an available state, and the available indication message carries the statistical information.

With reference to the first aspect, in a fourth possible implementation, after the sending, by the base station, statistical information of the permission of use of the unlicensed frequency band to user equipment after the permission of use of the unlicensed frequency band is obtained by means of contention, the method further includes:

receiving, by the base station, an RLM result sent by the user equipment; and instructing, by the base station according to the RLM result, the user equipment to stop using the unlicensed frequency band cell.

A second aspect of the embodiments of the present invention provides a base station, including:

a contention module, configured to contend for permission of use of an unlicensed frequency band; and a sending module, configured to send statistical information of the permission of use of the unlicensed frequency band to user equipment after the permission of use of the unlicensed frequency band is obtained by means of contention, where the statistical information indicates data that is obtained after statistics collection is performed on the permission of use of the unlicensed frequency band according to a preset statistical method, so that the user equipment determines whether a radio link fails.

With reference to the second aspect, in a first possible implementation, the statistical information indicates a quantity of cumulative times of obtaining the permission of use of the unlicensed frequency band by means of contention from a start moment to a moment of obtaining the permission of use of the unlicensed frequency band by means of contention, and the quantity of cumulative times is a loop count value in an agreed value range; or the statistical information indicates cumulative duration in which the permission of use of the unlicensed frequency band is obtained by means of contention from a start moment to a moment of obtaining the permission of use of the unlicensed frequency band by means of contention, and the cumulative duration is a loop count value in an agreed value range; or the statistical information indicates information about a ratio of cumulative duration in which the permission of use of the unlicensed frequency band is obtained by means of contention from a start moment to a moment of obtaining the permission of use of the unlicensed frequency band by means of contention to total duration from the start moment to the current moment, where the start moment is a moment at which the base station contends for the permission of use of the unlicensed frequency band for the first time, or a start moment of a time interval with an agreed period.

With reference to the first possible implementation of the second aspect, in a second possible implementation, the sending module is further configured to:

send identification information of the time interval with the agreed period to the user equipment.

With reference to any one of the second aspect, or the first or the second possible implementation, in a third possible implementation, the base station further includes:

a second sending module, configured to send an available indication message to the user equipment, where the available indication message is used to indicate that an unlicensed frequency band cell corresponding to the unlicensed frequency band switches from an unavailable state to an available state, and the available indication message carries the statistical information.

With reference to the second aspect, in a fourth possible implementation, the base station further includes:

a cell control module, configured to: receive an RLM result sent by the user equipment; and instruct, according to the RLM result, the user equipment to stop using the unlicensed frequency band cell.

A third aspect of the embodiments of the present invention provides a base station, including a processor and a memory, where the memory stores an instruction used for implementing the radio link monitoring method according to any one of the first aspect, or the first to the fourth possible implementations, and the processor calls and executes the instruction in the memory, and implements the radio link monitoring method according to any one of the first aspect, or the first to the fourth possible implementations.

A fourth aspect of the embodiments of the present invention provides a radio link monitoring method, including:

receiving, by user equipment, first statistical information sent by a base station, where the first statistical information is statistical information of permission of use of an unlicensed frequency band obtained by means of contention by the base station at a specified time interval;

determining, by the user equipment, second statistical information of the permission of use of the unlicensed frequency band at the specified time interval according to available indication information sent by the base station, where the second statistical information is statistical information that is obtained by means of statistics collection by the user equipment at the specified time interval and that is of the permission of use of the unlicensed frequency band; and obtaining, by the user equipment, an RLM result according to the first statistical information and the second statistical information.

With reference to the fourth aspect, in a first possible implementation, the RLM result is a difference between the first statistical information and the second statistical information.

With reference to the first possible implementation of the fourth aspect, in a second possible implementation, the method further includes:

reporting the RLM result to the base station when an absolute value of the RLM result is greater than a preset value, so that the base station executes a corresponding cell control policy according to the RLM result.

With reference to the fourth aspect, in a third possible implementation, the second statistical information indicates a quantity of cumulative times that is calculated at the specified time interval and that is of the permission of use of the unlicensed frequency band, and the quantity of cumulative times is a loop count value in an agreed value range; or the second statistical information indicates a cumulative time that is calculated at the specified time interval and that is of the permission of use of the unlicensed frequency band; or the second statistical information indicates information about a ratio of cumulative duration that is calculated at the specified time interval and that is of the permission of use of the unlicensed frequency band to total duration of the specified time interval, where the specified time interval is a periodic time interval, or a time interval from a moment at which the user equipment accesses an unlicensed frequency band cell corresponding to the unlicensed frequency band to a current moment.

With reference to the fourth aspect, in a fourth possible implementation, the method further includes:

reporting the RLM result to the base station after the specified time interval ends, so that the base station executes a corresponding cell control policy according to the RLM result.

A fifth aspect of the embodiments of the present invention provides user equipment, including:

a receiving module, configured to receive first statistical information sent by a base station, where the first statistical information is statistical information of permission of use of an unlicensed frequency band obtained by means of contention by the base station at a specified time interval;

a statistics collecting module, configured to determine second statistical information of the permission of use of the unlicensed frequency band at the specified time interval according to available indication information sent by the base station, where the second statistical information is statistical information that is obtained by means of statistics collection by the user equipment at the specified time interval and that is of the permission of use of the unlicensed frequency band; and a calculation module, configured to obtain an RLM result according to the first statistical information and the second statistical information.

With reference to the fifth aspect, in a first possible implementation, the RLM result is a difference between the first statistical information and the second statistical information.

With reference to the first possible implementation of the fifth aspect, in a second possible implementation, the user equipment further includes:

a reporting module, configured to report the RLM result to the base station when an absolute value of the RLM result is greater than a preset value, so that the base station executes a corresponding cell control policy according to the RLM result.

With reference to the fifth aspect, in a third possible implementation, the second statistical information indicates a quantity of cumulative times that is calculated at the specified time interval and that is of the permission of use of the unlicensed frequency band, and the quantity of cumulative times is a loop count value in an agreed value range; or the second statistical information indicates a cumulative time that is calculated at the specified time interval and that is of the permission of use of the unlicensed frequency band; or the second statistical information indicates information about a ratio of cumulative duration that is calculated at the specified time interval and that is of the permission of use of the unlicensed frequency band to total duration of the specified time interval, where the specified time interval is a periodic time interval, or a time interval from a moment at which the user equipment accesses an unlicensed frequency band cell corresponding to the unlicensed frequency band to a current moment.

With reference to the fifth aspect, in a fourth possible implementation, the user equipment is further configured to:

report the RLM result to the base station after the specified time interval ends, so that the base station executes a corresponding cell control policy according to the RLM result.

A sixth aspect of the embodiments of the present invention provides user equipment, including a processor and a memory, where the memory stores an instruction used for implementing the radio link monitoring method according to any one of the fifth aspect, or the first to the fourth possible implementations, and the processor calls and executes the instruction in the memory, and implements the radio link monitoring method according to any one of the fifth aspect, or the first to the fourth possible implementations.

A seventh aspect of the embodiments of the present invention provides a radio link monitoring method, including:

determining, by user equipment, a quantity of cumulative times of receiving, in a preset time interval, available indication information sent by a base station, where a start moment of the preset time interval is a moment at which last time the user equipment receives the available indication information sent by the base station, or a start moment of a periodic time interval, or a moment at which the user equipment accesses an unlicensed frequency band cell corresponding to the unlicensed frequency band; and initiating, by the user equipment, an RRC connection reestablishment procedure if the quantity of cumulative times of receiving the available indication information in the preset time interval is less than a preset quantity of times; and/or sending a radio link failure report to the base station.

An eighth aspect of the embodiments of the present invention provides a communications system, including a base station and user equipment, where the base station is configured to: collect statistics about first statistical information of permission of use of an unlicensed frequency band obtained by means of contention at a specified time interval; and send the first statistical information to the user equipment; and the user equipment is configured to: receive the first statistical information sent by the base station, and collect statistics about second statistical information of the permission of use of the unlicensed spectrum at the specified time interval; and obtain an RLM result according to the first statistical information and the second statistical information.

The present invention has the following beneficial effects:

When obtaining the permission of use of the unlicensed frequency band by means of contention, the base station sends, to the user equipment, the statistical information of the unlicensed frequency band obtained by means of contention at the specified time interval. Therefore, when the user equipment is configured to independently use an unlicensed cell, or the user equipment is configured to perform inter-base station dual connectivity on a licensed cell and an unlicensed cell, a problem that communication quality of the terminal is reduced and even interrupted because the user equipment cannot find reduction of radio channel quality of the licensed cell in a timely manner is resolved, and service quality of the user equipment is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In addition, aspects or features of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine-readable media" may include but is not limited to a radio channel, and various other media that can store, contain and/or carry an instruction and/or data.

Multiple communications standards described in all implements include but is not limited to GSM (Global System of Mobile communication, Global System for Mobile Communications), CDMA (Code Division Multiple Access, Code Division Multiple Access), WCDMA (Wideband Code Division Multiple Access, Wideband Code Division Multiple Access), LTE (Long Term Evolution, Long Term Evolution), a future 5G network standard, a wireless local area network (Wireless Local Area Networks, WLAN), Worldwide Interoperability for Microwave Access (Worldwide Interoperability for Microwave Access, WiMAX), a Bluetooth communications standard, an infrared communications standard, and the like.

Figure 2:
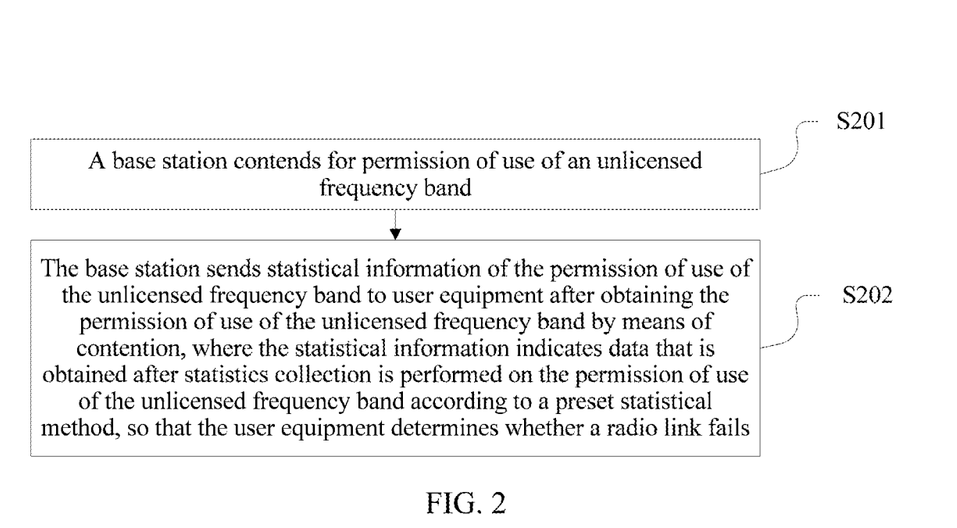
FIG. 2 is a schematic flowchart of a radio link monitoring method according to an embodiment of the present invention.

Referring to FIG. 2, FIG. 2 is a schematic flowchart of a radio link monitoring method according to an embodiment of the present invention. In this embodiment of the present invention, the method includes the following steps.

S201. A base station contends for permission of use of an unlicensed frequency band.

Specifically, the unlicensed frequency band is not allocated to a fixed user, and multiple users need to obtain the permission of use of the unlicensed frequency band by means of contention. When the base station needs to transmit data (including service data or control signaling) by using the unlicensed frequency band, the base station first needs to obtain the permission of use of the unlicensed frequency band channel, occupies the unlicensed frequency band channel for specific duration, and then transmits the data in the occupation duration. A method for contending for the permission of use of the unlicensed frequency band channel by the base station may be based on a CCA (Clear Channel Assessment, clear channel assessment, CCA for short) detection mechanism or an ECCA (Enhanced Clear Channel Assessment, enhanced clear channel assessment, ECCA for short) detection mechanism. For example, when detecting, in a CCA time period, that the unlicensed frequency band is in an idle state, the base station obtains the permission of use of the unlicensed frequency band by means of contention, and occupies the unlicensed frequency band for the specific duration. Alternatively, when detecting, in a CCA time period, that the unlicensed frequency band is in a busy state, the base station triggers an ECCA detection procedure, and sets a random number. Subsequently, when the base station detects, in each CCA time period, that the unlicensed frequency band is in an idle state, the random number decreases by 1. When the random number is 0, the base station obtains the permission of use of the unlicensed frequency band by means of contention, and occupies the unlicensed frequency band for the specific duration. A method for detecting a state of the unlicensed frequency band by the base station in the CCA time period may be: measuring a received signal power on the unlicensed frequency band in the CCA time period, and when the received signal power is less than a preset power threshold, determining that the unlicensed frequency band is in an idle state in the CCA time period.

S202. The base station sends statistical information of the permission of use of the unlicensed frequency band to user equipment after obtaining the permission of use of the unlicensed frequency band by means of contention at a current moment, where the statistical information indicates data that is obtained after statistics collection is performed on the permission of use of the unlicensed frequency band according to a preset statistical method.

Specifically, a moment at which the base station obtains the permission of use of the unlicensed frequency band by means of contention is the current moment. For example, in the CCA detection mechanism, the current moment is an end moment of the CCA time period in which it is detected that the unlicensed frequency band is in an idle state; and in the ECCA detection mechanism, the current moment is a moment at which a corresponding CCA time period ends when the random number is 0. After the base station obtains the permission of use of the unlicensed frequency band by means of contention at the current moment, the base station sends the statistical information of the permission of use of the unlicensed frequency band to the user equipment in a cell corresponding to the unlicensed frequency band. The statistical information indicates the data that is obtained after the statistics collection is performed on the permission of use of the unlicensed frequency band according to the preset statistical method, for example, data that is obtained after statistics collection is performed on a quantity of times of the permission of use of the unlicensed frequency band at a specified time interval, duration, ratio information, and the like. The specified time interval may be a periodic time interval, or an aperiodic time interval. This is not limited in the present invention.

When sending the statistical information to the user equipment, the base station may independently send the statistical information to the user equipment, or add the statistical information to the control signaling for sending to the user equipment. For example, an available indication message carries the statistical information, and the available indication message is used to indicate that the unlicensed frequency band switches from a busy state to an idle state, that is, an unlicensed frequency band cell corresponding to the unlicensed frequency band switches from an unavailable state to an available state.

In this embodiment of the present invention, when obtaining the permission of use of the unlicensed frequency band by means of contention, the base station sends, to the user equipment, the statistical information of the unlicensed frequency band obtained by means of contention at the specified time interval. Therefore, when the user equipment is configured to independently use an unlicensed cell, or the user equipment is configured to perform inter-base station dual connectivity on a licensed cell and an unlicensed cell, a problem that communication quality of the terminal is reduced and even interrupted because the user equipment cannot find reduction of radio channel quality of the licensed cell in a timely manner is resolved, and service quality of the user equipment is improved.

Optionally, the statistical information indicates a quantity of cumulative times of obtaining the permission of use of the unlicensed frequency band by means of contention from a start moment to a moment of obtaining the permission of use of the unlicensed frequency band by means of contention, and the quantity of cumulative times is a loop count value in an agreed value range.

The start moment is a moment at which the base station contends for the permission of use of the unlicensed frequency band for the first time, or a start moment of a time interval with an agreed period.

Specifically, the statistical information indicates the quantity of cumulative times of obtaining the permission of use of the unlicensed frequency band by means of contention from the start moment to the current moment, that is, the base station calculates a quantity of times of obtaining the permission of use of the unlicensed frequency band by means of contention at the specified time interval. The specified time interval is classified into two types: A first type is a time interval from the moment at which the base station contends for the permission of use of the unlicensed frequency band for the first time and that is used as a start moment to the current moment; and a second type is any time interval with an agreed period, and the time interval occurs at an interval of the agreed period. When the specified time interval is of the first type, duration of the time interval may be excessively long. Each time the base station preempts the permission of use of the unlicensed frequency band at the specified time interval, a count value increases by 1. When the count value exceeds a preset value, the count value is reset, and the count value increases by 1 again. In this case, the count value is the quantity of cumulative times, and the quantity of cumulative times is the loop count value. If the specified time interval is of the second type, each time the base station preempts the permission of use of the unlicensed frequency band at the specified time interval, a count value increases by 1. When the count value exceeds a preset value, the count value is reset. In a next time interval, the count value in a last time interval is reset, and counting is started from an initial value 0 at a current time interval.

The statistical information indicates cumulative duration in which the permission of use of the unlicensed frequency band is obtained by means of contention from a start moment to the current moment, and the cumulative duration is a loop count value in an agreed value range.

The start moment is a moment at which the base station contends for the permission of use of the unlicensed frequency band for the first time, or a start moment of a time interval with an agreed period.

Specifically, the statistical information indicates the cumulative duration in which the permission of use of the unlicensed frequency band is obtained by means of contention from the start moment to the current moment, that is, the base station calculates cumulative duration in which the unlicensed frequency band is occupied at the specified time interval. The specified time interval is classified into two types: A first type is a time interval from the moment at which the base station contends for the permission of use of the unlicensed frequency band for the first time and that is used as a start moment to the current moment; and a second type is any time interval with an agreed period, and the time interval occurs at an interval of the agreed period. When the specified time interval is of the first type, duration of the time interval may be excessively long; each time the base station obtains the permission of use of the unlicensed frequency band by means of contention at the specified time interval, the base station occupies the unlicensed frequency band for specific duration, and cumulates duration in which the unlicensed frequency band is occupied, to obtain cumulative duration at the specified time interval; and when the cumulative duration exceeds a preset value, the cumulative duration is reset, and the cumulative duration is recalculated. When the specified time interval is of the second type, each time the base station obtains the permission of use of the unlicensed frequency band by means of contention, the base station occupies the unlicensed frequency band for specific duration, and calculates cumulative duration in which the unlicensed frequency band is occupied at the specified time interval. When calculating the cumulative duration at a new time interval, the base station starts calculation from an initial value 0.

It should be noted that when obtaining the permission of use of the unlicensed frequency band by means of contention, the base station occupies the unlicensed frequency band for preset duration, and sends an available indication message to the user equipment in an unlicensed frequency band cell corresponding to the unlicensed frequency band, and the available indication message carries the preset duration, so that the user equipment can obtain an available time window of the unlicensed frequency band cell corresponding to the unlicensed frequency band, and transmit data in the time window.

Optionally, the statistical information indicates information about a ratio of cumulative duration in which the permission of use of the unlicensed frequency band is obtained by means of contention from a start moment to a moment of obtaining the permission of use of the unlicensed frequency band by means of contention to total duration from the start moment to the current moment.

The start moment is a moment at which the base station contends for the permission of use of the unlicensed frequency band for the first time, or a start moment of a time interval with an agreed period.

Specifically, the statistical information indicates the information about the ratio of the cumulative duration in which the permission of use of the unlicensed frequency band is obtained by means of contention from the start moment to the current moment to the total duration from the start moment to the current moment, and the current moment is the moment of obtaining the permission of use of the unlicensed frequency band by means of contention. That is, the base station collects statistics about information about a ratio of cumulative duration in which the unlicensed frequency band is occupied at the specified time interval to total duration of the specified time interval. The specified time interval is classified into two types: A first type is a time interval from the moment at which the base station contends for the permission of use of the unlicensed frequency band for the first time and that is used as a start moment to the current moment; and a second type is any time interval with an agreed period, and the time interval occurs at an interval of the agreed period. When the specified time interval is of the first type, the specified time interval is aperiodic, and the base station calculates, at the specified time interval, the cumulative duration in which the unlicensed frequency band is occupied, and calculates the total duration of the specified time interval, to obtain the information about the ratio of the cumulative duration to the total duration. When the specified time interval is of the second type, the specified time interval is any time period that occurs in the agreed period, total duration of each time interval is a fixed value, and the base station calculates the cumulative duration in which the unlicensed frequency band is occupied at the specified time interval, to obtain the ratio information according to the cumulative duration and the total duration.

Optionally, after the sending, by the base station, statistical information of the permission of use of the unlicensed frequency band to user equipment after the permission of use of the unlicensed frequency band is obtained by means of contention at a current moment, the method further includes:

sending, by the base station, identification information of the time interval with the agreed period to the user equipment.

Specifically, after the base station obtains the permission of use of the unlicensed frequency band channel by means of contention at the current moment, the base station obtains the statistical information of the permission of use of the unlicensed frequency band at the specified time interval, and the statistical information includes: a quantity of cumulative times in which the unlicensed frequency band is in an idle state at the specified time interval, cumulative duration in which the unlicensed frequency band is occupied at the specified time interval, and information about a ratio of the cumulative duration to the total duration of the specified time interval. The base station sends the obtained statistical information to the user equipment, collects statistics about the identification information that further needs to be sent by the base station to the user equipment at the specified time interval, and notifies the user equipment of a time interval at which statistics collection is performed on the statistical information.

It can be understood that when the specified time interval is of the first type, the base station also needs to send the identification information of the specified time interval to the user equipment, and the user equipment obtains, according to the identification information, a time interval at which the base station performs statistics collection.

Optionally, the method further includes:

sending, by the base station, an available indication message to the user equipment, where the available indication message is used to indicate that an unlicensed frequency band cell corresponding to the unlicensed frequency band switches from an unavailable state to an available state, and the available indication message carries the statistical information.

Specifically, the base station detects, by means of listening in the CCA time period, that the unlicensed frequency band is in an idle state, sends the available indication message to the user equipment after the CCA time period ends. The available indication message is used to indicate that the unlicensed frequency band cell switches from an unavailable state to an available state, and the available indication message carries the statistical information and occupation duration in which the base station occupies the unlicensed frequency band. The user equipment may obtain the statistical information at a time interval same as that of the base station. In a process in which the base station sends the available indication message to the user equipment, the user equipment may not receive the indication message. This causes an offset between statistical information collected by the user equipment at the specified time interval and statistical information collected by the base station at the specified time interval. The user equipment compares the statistical information obtained by means of statistics collection by the user equipment with the statistical information from the base station, to calibrate an RLM (Radio Link Monitoring, radio link monitoring, RLM for short) result. The RLM result indicates quality of a radio link between the user equipment and the base station.

It should be noted that when the offset between the statistical information collected by the user equipment and the statistical information collected by the base station is greater than a preset value, it indicates that the radio link between the user equipment and the base station fails, and the user equipment initiates an RRC reconnection to the base station, or the user equipment sends a radio link failure report to the base station.

Optionally, after the sending, by the base station, statistical information of the permission of use of the unlicensed frequency band to user equipment after the permission of use of the unlicensed frequency band is obtained by means of contention at a current moment, the method further includes:

receiving, by the base station, an RLM result sent by the user equipment; and instructing, by the base station according to the RLM result, the user equipment to stop using the unlicensed frequency band cell.

Specifically, a manner in which the user equipment sends the RLM result to the base station includes event triggering and periodic triggering. In case of event triggering, the base station receives the RLM result sent by the user equipment, and instructs the user equipment to stop using the unlicensed frequency band cell. In case of periodic triggering, the base station needs to determine a time interval corresponding to the RLM result reported by the user equipment, and the base station obtains statistical information at the time interval, compares the statistical information with statistical information in the RLM result, and determines, according to a comparison result, whether to instruct the user equipment to stop using the unlicensed frequency band cell.

Figure 3:
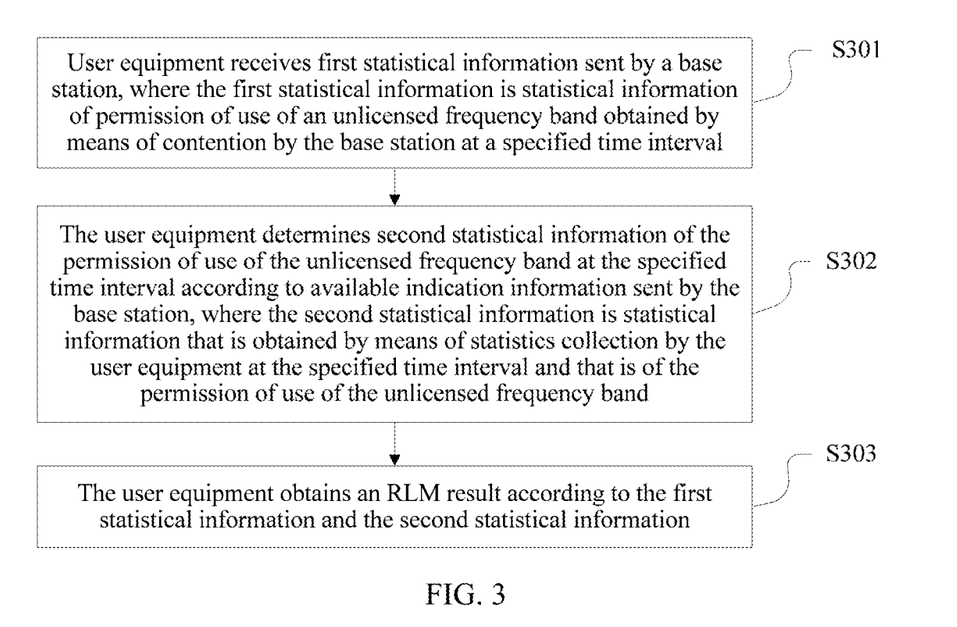
FIG. 3 is another schematic flowchart of a radio link monitoring method according to an embodiment of the present invention.

Referring to FIG. 3, FIG. 3 is a schematic flowchart of a radio link monitoring method according to an embodiment of the present invention. In this embodiment of the present invention, the method includes the following steps.

S301. User equipment receives first statistical information sent by a base station, where the first statistical information is statistical information of permission of use of an unlicensed frequency band obtained by means of contention by the base station at a specified time interval.

Specifically, the user equipment receives the first statistical information sent by the base station. The first statistical information is the statistical information of the permission of use of the unlicensed frequency band obtained by means of contention by the base station at the specified time interval. For example, the first statistical information includes a quantity of cumulative times in which the base station obtains the permission of use of the unlicensed frequency band by means of contention at a specified interval. That is, each time the base station preempts the permission of use of the unlicensed frequency band at the specified time interval, the base station sends an available indication message to the user equipment, and a count value increases by 1. When the specified time interval ends, a final count value is obtained, and the final count value is the quantity of cumulative times, or cumulative duration in which the base station occupies the unlicensed frequency band at the specified time interval, or information about a ratio of cumulative duration to total duration of the specified time interval.

S302. The user equipment determines second statistical information of the permission of use of the unlicensed frequency band at the specified time interval according to available indication information sent by the base station, where the second statistical information is statistical information that is obtained by means of statistics collection by the user equipment at the specified time interval and that is of the permission of use of the unlicensed frequency band.

Specifically, the user equipment determines the second statistical information of the permission of use of the unlicensed frequency band at the specified time interval according to the available indication message sent by the base station. Because the user equipment performs statistics collection according to the available indication message, if the available indication message is missed, the second statistical information obtained by means of statistics collection by the user equipment at the specified time interval is inconsistent with the first statistical information. For example, the user equipment calculates a quantity of available indication messages received at the specified time interval, and uses the quantity of available indication messages as a quantity of cumulative times that is calculated by the user equipment and in which the unlicensed frequency band is in an idle state, and the quantity of cumulative times is the second statistical information. Alternatively, the user equipment calculates, according to duration in which the unlicensed frequency band carried in the available indication message received at the specified time interval is occupied, the cumulative duration in which the unlicensed frequency band is occupied at the specified time interval, and the cumulative duration is the second statistical information. Alternatively, the user equipment obtains the ratio information according to the cumulative duration and the total duration of the specified time interval, and the ratio information is the second statistical information.

S303. The user equipment obtains an RLM result according to the first statistical information and the second statistical information.

Specifically, the first statistical information obtained by the user equipment is sent by the base station, and is an accurate value. The user equipment performs calibration according to the second statistical information, to obtain the RLM result.

Optionally, the specified time interval is a periodic time interval, or a time interval from a moment at which the user equipment accesses an unlicensed frequency band cell corresponding to the unlicensed frequency band to a current moment.

Specifically, the time interval occurs at an interval of a specific period. The specified time interval is any periodic time interval, or the specified time interval is the time interval from the moment at which the user equipment accesses the unlicensed frequency band cell to the current moment. A time interval measured by the user equipment needs to be consistent with a time interval measured by the base station.

Optionally, the RLM result is a difference between the first statistical information and the second statistical information.

For example, when the first statistical information and the second statistical information are a quantity of cumulative times, a quantity of cumulative times corresponding to the first statistical information is 10, and a quantity of cumulative times corresponding to the second statistical information is 8, the RLM result is 10−8=2 times. When the first statistical information and the second statistical information are cumulative duration, cumulative duration corresponding to the first statistical information is 100 ms, and cumulative duration corresponding to the second statistical information is 90 ms, the RLM result is 100 ms-90 ms=10 ms. When the first statistical information and the second statistical information are ratio information, and the total duration is 150 ms, ratio information corresponding to the first statistical information is 100/150=0.67, ratio information corresponding to the second statistical information is 90/150=0.6, and the RLM result is 0.77−0.6=0.17.

It should be noted that when an absolute value of the RLM result is greater than a preset value, it indicates that the user equipment misses a large quantity of available indication messages, and a radio link between the user equipment and the base station fails. In this case, the user equipment may report the RLM result to the base station, and the base station instructs, according to the RLM result, the user equipment to stop using the unlicensed frequency band cell.

Optionally, an embodiment of the present invention further provides a radio link monitoring method, including: determining, by user equipment, a quantity of cumulative times of receiving, at a preset time interval, available indication information sent by a base station, where a start moment of the preset time interval is a moment at which last time the user equipment receives the available indication information sent by the base station, or a start moment of a periodic time interval, or a moment at which the user equipment accesses an unlicensed frequency band cell corresponding to the unlicensed frequency band; initiating, by the user equipment, an RRC connection reestablishment procedure if the quantity of cumulative times of receiving the available indication information at the preset time interval is less than a preset quantity of times; and/or sending a radio link failure report to the base station.

Specifically, when the quantity of cumulative times in which the user equipment receives the available indication message at the preset time interval is less than the preset quantity of times, it indicates that a state of a link between the user equipment and the base station deteriorates, and normal communication cannot be maintained. In this case, the user equipment may initiate an RRC (Radio Resource Control, radio resource control, RRC for short) reconnection and/or send the radio link failure report to the base station.

Optionally, the second statistical information indicates a quantity of cumulative times that is calculated at the specified time interval and that is of the permission of use of the unlicensed frequency band, and the quantity of cumulative times is a loop count value in an agreed value range.

Specifically, the specified time interval is a time interval at which the base station notifies the user equipment. The second statistical information indicates the quantity of cumulative times that is calculated by a user at the specified time interval and that is of the permission of use of the unlicensed frequency band. A method for calculating a quantity of cumulative times by the user equipment may be determined according to the available indication message sent by the base station at the specified time interval. Each time detecting, at the specified time interval, that the unlicensed frequency band is in an idle state, the base station sends the available indication message to the user equipment. Therefore, a quantity of times of sending the available indication message is equal to a quantity of cumulative times of obtaining the permission of use of the unlicensed frequency band by means of contention, and the quantity of cumulative times is a loop count value in a specified value range. When duration of the specified time interval is long enough, the quantity of cumulative times may exceed a range of a counter. To avoid this case, the quantity of cumulative times returns to zero when the quantity of cumulative times is greater than a preset value, and counting is performed again.

It should be noted that the specified time interval may be any periodic time interval, or any aperiodic time interval specified by the base station, for example, a time interval from a moment at which the base station contends for the unlicensed frequency band to a current moment for the first time, or a time interval from a moment at which the user equipment first accesses the unlicensed frequency band to a current moment.

Optionally, the second statistical information indicates a cumulative time that is calculated at the specified time interval and that is of the permission of use of the unlicensed frequency band.

Specifically, when detecting, by means of listening at the specified time interval, that the unlicensed frequency band is in an idle state, the base station sends an available indication message to the user equipment, and the available indication message further carries duration in which the base station occupies the unlicensed frequency band. The user equipment may calculate, according to each received available indication message and the carried duration in which the unlicensed frequency band is occupied, the cumulative time of the permission of use of the unlicensed frequency band at the specified time interval. For example, the duration of the specified time interval is 100 ms, the user equipment receives the available indication message three times, and the duration that is carried in the available indication message and in which the unlicensed frequency band is occupied is 10 ms each time. In this case, the cumulative duration of the unlicensed frequency band calculated by the user equipment is 30 ms at the specified time interval.

Optionally, the second statistical information indicates information about a ratio of cumulative duration that is calculated at the specified time interval and that is of the permission of use of the unlicensed frequency band to total duration from a start moment to the current moment.

Specifically, when detecting, by means of listening at the specified time interval, that the unlicensed frequency band is in an idle state, the base station sends an available indication message to the user equipment, and the available indication message further carries duration in which the base station occupies the unlicensed frequency band. The user equipment may calculate, according to each received available indication message and the carried duration in which the unlicensed frequency band is occupied, the cumulative time of the permission of use of the unlicensed frequency band at the specified time interval. For example, the duration of the specified time interval is 100 ms, the user equipment receives the available indication message three times, and the duration that is carried in the available indication message and in which the unlicensed frequency band is occupied is 10 ms each time. In this case, the cumulative duration of the unlicensed frequency band calculated by the user equipment is 30 ms at the specified time interval, and obtained information about a ratio of the cumulative duration to total duration of the specified time interval is 30/100=0.3.

Optionally, the RLM result is reported to the base station after the specified time interval ends, so that the base station executes a corresponding cell control policy according to the RLM result.

Specifically, the RLM result includes an absolute value of a difference between the quantity of cumulative times in which the base station obtains the permission of use of the unlicensed frequency band by means of contention at the specified time interval and the quantity of cumulative times that is calculated by the user equipment at the specified time interval and that is of the permission of use of the unlicensed frequency band; or an absolute value of a difference between the cumulative duration in which the base station obtains the permission of use of the unlicensed frequency band by means of contention at the specified time interval and the cumulative duration that is calculated by the user equipment at the specified time interval and that is of the permission of use of the unlicensed frequency band. Alternatively, it is assumed that the ratio of the cumulative duration in which the base station obtains the permission of use of the unlicensed frequency band by means of contention at the specified time interval to the total duration of the specified time interval is first ratio information, or it is assumed that the ratio of the cumulative duration that is calculated by the user equipment at the specified time interval and that is of the permission of use of the unlicensed frequency band to the total duration of the specified time interval is second ratio information, and the RLM result is an absolute value of a difference between the first ratio information and the second ratio information. The user equipment reports the RLM result to the base station after the specified time interval ends, and the base station executes the corresponding cell control policy according to the RLM result. For example, when the RLM result is greater than a preset value, it indicates that a radio link fails, and the base station instructs the user equipment to stop using the unlicensed frequency band cell corresponding to the unlicensed frequency band.

It should be noted that the user equipment is not limited to reporting the RLM result to the base station after the specified time interval ends. The user equipment determines, before reporting, whether the RLM result is greater than the preset value. For example, when an absolute value of a difference between quantities of cumulative times, or an absolute value of a difference between cumulative duration, or an absolute value of a difference between ratio information is greater than the preset value, the user equipment reports the RLM result to the base station, otherwise, the user equipment does not report the RLM result.

Figure 4:
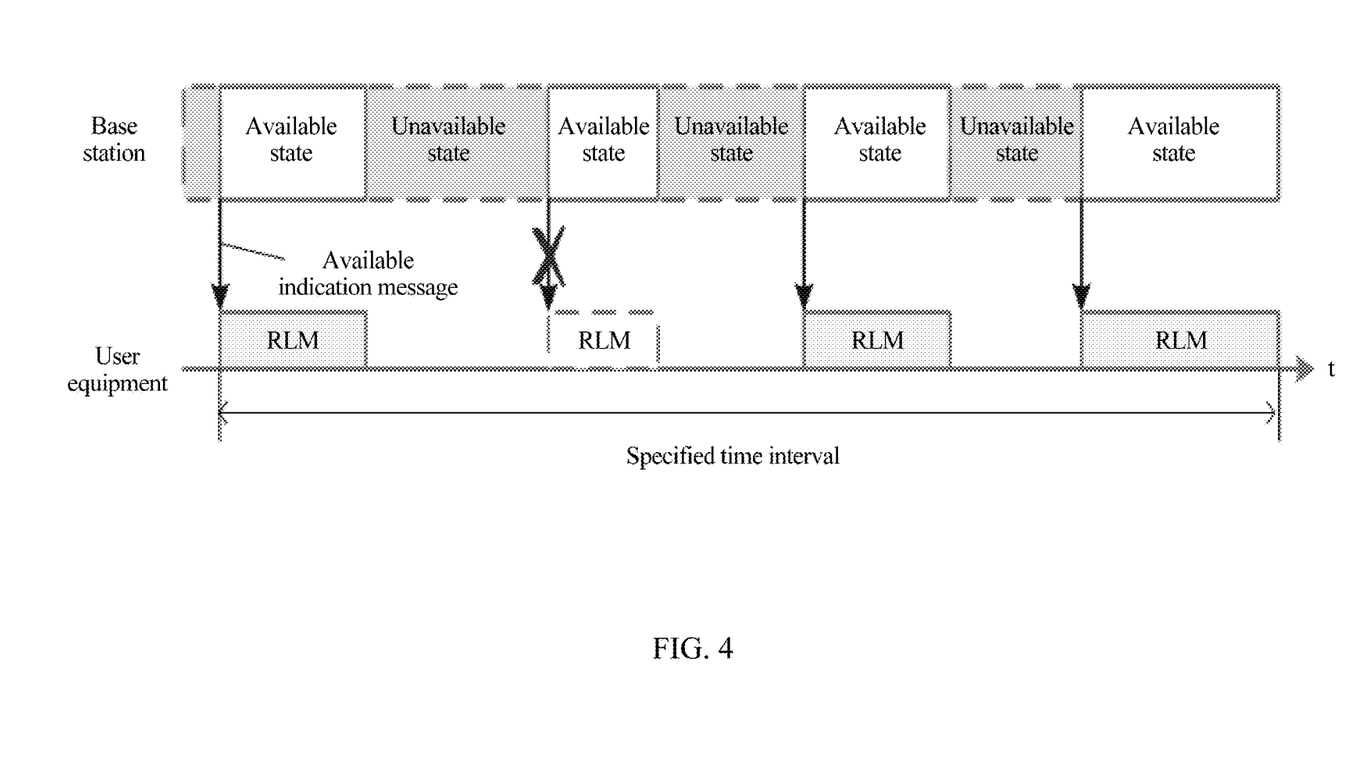
FIG. 4 is a schematic diagram of a time sequence of a radio link monitoring method according to an embodiment of the present invention.

For example, refer to FIG. 4. When detecting, by means of listening, that the unlicensed frequency band cell is in an available state, the base station sends an available indication message to the user equipment, and the available indication message carries duration in which the unlicensed frequency band is occupied. It can be seen from FIG. 4 that a quantity of times in which the base station obtains the permission of use of the unlicensed frequency band by means of contention at the specified time interval is 4, the user equipment does not receive the available indication message sent by the base station for the second time, and a quantity of times that is calculated by the user equipment at the specified time interval and that is of the permission of use of the unlicensed spectrum is 3.

Figure 5:
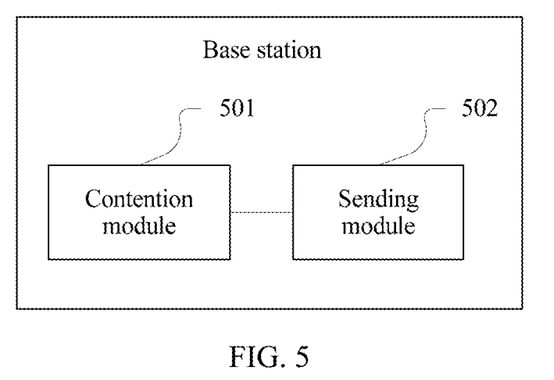
FIG. 5 is a schematic structural diagram of a base station according to an embodiment of the present invention.

Referring to FIG. 5, FIG. 5 is a schematic structural diagram of a base station according to an embodiment of the present invention. In this embodiment of the present invention, the base station includes a contention module 501 and a sending module 502.

The contention module 501 is configured to contend for permission of use of an unlicensed frequency band.

The sending module 502 is configured to send statistical information of the permission of use of the unlicensed frequency band to user equipment after the permission of use of the unlicensed frequency band is obtained by means of contention, where the statistical information indicates data that is obtained after statistics collection is performed on the permission of use of the unlicensed frequency band according to a preset statistical method, so that the user equipment determines whether a radio link fails.

Optionally, the statistical information indicates a quantity of cumulative times of obtaining the permission of use of the unlicensed frequency band by means of contention from a start moment to a moment of obtaining the permission of use of the unlicensed frequency band by means of contention, and the quantity of cumulative times is a loop count value in an agreed value range; or the statistical information indicates cumulative duration in which the permission of use of the unlicensed frequency band is obtained by means of contention from a start moment to a moment of obtaining the permission of use of the unlicensed frequency band by means of contention, and the cumulative duration is a loop count value in an agreed value range; or the statistical information indicates information about a ratio of cumulative duration in which the permission of use of the unlicensed frequency band is obtained by means of contention from a start moment to a moment of obtaining the permission of use of the unlicensed frequency band by means of contention to total duration from the start moment to the current moment.

The start moment is a moment at which the base station contends for the permission of use of the unlicensed frequency band for the first time, or a start moment of a time interval with an agreed period.

Optionally, the sending module is further configured to:
send identification information of the time interval with the agreed period to the user equipment.

Optionally, the base station further includes:
a second sending module, configured to send an available indication message to the user equipment, where the available indication message is used to indicate that an unlicensed frequency band cell corresponding to the unlicensed frequency band switches from an unavailable state to an available state, and the available indication message carries the statistical information.

Optionally, the base station further includes:
a cell control module, configured to: receive an RLM result sent by the user equipment; and instruct, according to the RLM result, the user equipment to stop using the unlicensed frequency band cell.

This embodiment of the present invention and the foregoing method embodiment are based on a same idea, and technical effects brought by this embodiment of the present invention and the foregoing method embodiment are also the same. For a specific principle, refer to the descriptions of the method Embodiment 1. Details are not described herein again.

Figure 6:
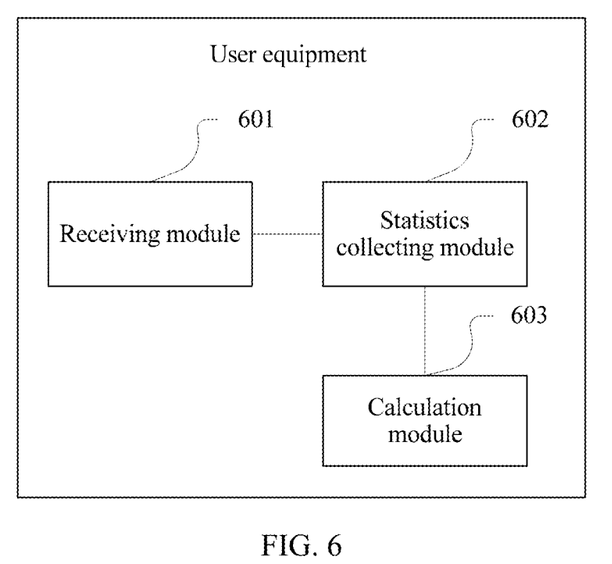
FIG. 6 is a schematic structural diagram of user equipment according to an embodiment of the present invention.

Referring to FIG. 6, FIG. 6 is a schematic structural diagram of user equipment according to an embodiment of the present invention. In this embodiment of the present invention, the user equipment includes a receiving module 601, a statistics collecting module 602, and a calculation module 603.

The receiving module 601 is configured to receive first statistical information sent by a base station, where the first statistical information is statistical information of permission of use of an unlicensed frequency band obtained by means of contention by the base station at a specified time interval.

The statistics collecting module 602 is configured to determine second statistical information of the permission of use of the unlicensed frequency band at the specified time interval according to available indication information sent by the base station, where the second statistical information is statistical information that is obtained by means of statistics collection by the user equipment at the specified time interval and that is of the permission of use of the unlicensed frequency band.

The calculation module 603 is configured to obtain an RLM result according to the first statistical information and the second statistical information.

Optionally, the RLM result is a difference between the first statistical information and the second statistical information.

Optionally, the user equipment further includes:

a reporting module, configured to report the RLM result to the base station when an absolute value of the RLM result is greater than a preset value, so that the base station executes a corresponding cell control policy according to the RLM result.

Optionally, the second statistical information indicates a quantity of cumulative times that is calculated at the specified time interval and that is of the permission of use of the unlicensed frequency band, and the quantity of cumulative times is a loop count value in an agreed value range; or the second statistical information indicates a cumulative time that is calculated at the specified time interval and that is of the permission of use of the unlicensed frequency band; or the second statistical information indicates information about a ratio of cumulative duration that is calculated at the specified time interval and that is of the permission of use of the unlicensed frequency band to total duration of the specified time interval.

The specified time interval is a periodic time interval, or a time interval from a moment at which the user equipment accesses an unlicensed frequency band cell corresponding to the unlicensed frequency band to a current moment.

Optionally, the user equipment is further configured to:

report the RLM result to the base station after the specified time interval ends, so that the base station executes a corresponding cell control policy according to the RLM result.

This embodiment of the present invention and the foregoing method embodiment 2 are based on a same idea, and technical effects brought by this embodiment of the present invention and the foregoing method embodiment are also the same. For a specific principle, refer to the descriptions of the method embodiment 2. Details are not described herein again.

Figure 7:
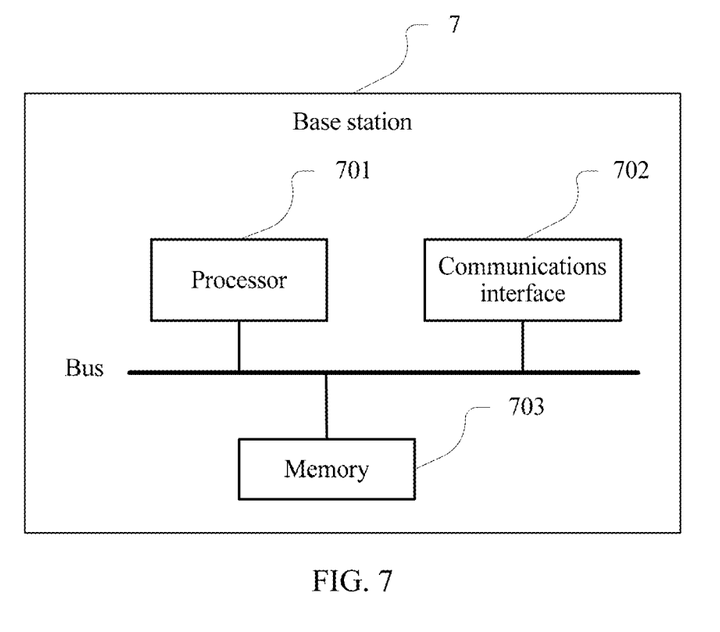
FIG. 7 is another schematic structural diagram of a base station according to an embodiment of the present invention.

Referring to FIG. 7, FIG. 7 is another schematic structural diagram of a base station according to an embodiment of the present invention. In this embodiment of the present invention, the base station includes a processor 701, a memory 703, and a communications interface 702. The communications interface 702 is configured to communicate with an external device. There may be one or more processors in the base station. In some embodiments of the present invention, the processor 701, the memory 703, and the communications interface 702 may be connected by using a bus or in another manner. The base station may be configured to execute the method shown in FIG. 1. For meanings and examples of the terms in this embodiment, refer to the embodiment corresponding to FIG. 1. Details are not described herein again.

The memory 703 stores program code. The processor 701 is configured to call the program code stored in the memory 703, so as to perform the following operations:

contending for permission of use of an unlicensed frequency band; and sending statistical information of the permission of use of the unlicensed frequency band to user equipment after the permission of use of the unlicensed frequency band is obtained by means of contention, where the statistical information indicates data that is obtained after statistics collection is performed on the permission of use of the unlicensed frequency band according to a preset statistical method, so that the user equipment determines whether a radio link fails.

In some embodiments of the present invention, the statistical information indicates a quantity of cumulative times of obtaining the permission of use of the unlicensed frequency band by means of contention from a start moment to a moment of obtaining the permission of use of the unlicensed frequency band by means of contention, and the quantity of cumulative times is a loop count value in an agreed value range; or the statistical information indicates cumulative duration in which the permission of use of the unlicensed frequency band is obtained by means of contention from a start moment to a moment of obtaining the permission of use of the unlicensed frequency band by means of contention, and the cumulative duration is a loop count value in an agreed value range; or the statistical information indicates information about a ratio of cumulative duration in which the permission of use of the unlicensed frequency band is obtained by means of contention from a start moment to a moment of obtaining the permission of use of the unlicensed frequency band by means of contention to total duration from the start moment to the current moment.

The start moment is a moment at which the base station contends for the permission of use of the unlicensed frequency band for the first time, or a start moment of a time interval with an agreed period.

In some embodiments of the present invention, the sending, by the processor, statistical information of the permission of use of the unlicensed frequency band to user equipment after the permission of use of the unlicensed frequency band is obtained by means of contention further includes:

sending, by the base station, identification information of the time interval with the agreed period to the user equipment.

In some embodiments of the present invention, the processor is further configured to perform the following operation:

sending, by the base station, an available indication message to the user equipment, where the available indication message is used to indicate that an unlicensed frequency band cell corresponding to the unlicensed frequency band switches from an unavailable state to an available state, and the available indication message carries the statistical information.

In some embodiments of the present invention, after the sending, by the processor, statistical information of the permission of use of the unlicensed frequency band to user equipment after the permission of use of the unlicensed frequency band is obtained by means of contention, the processor is further configured to perform the following operations:

receiving, by the base station, an RLM result sent by the user equipment; and instructing, by the base station according to the RLM result, the user equipment to stop using the unlicensed frequency band cell.

Figure 8:
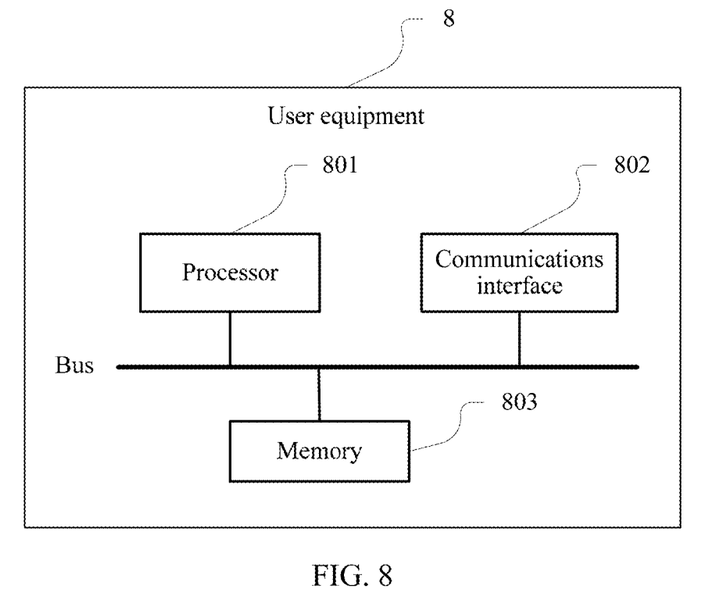
FIG. 8 is another schematic structural diagram of user equipment according to an embodiment of the present invention.

Referring to FIG. 8, FIG. 8 is another schematic structural diagram of user equipment according to an embodiment of the present invention. In this embodiment of the present invention, the user equipment includes a processor 801, a memory 803, and a communications interface 802. The communications interface 802 is configured to communicate with an external device. There may be one or more processors in the user equipment. In some embodiments of the present invention, the processor 801, the memory 803, and the communications interface 802 may be connected by using a bus or in another manner. The base station may be configured to execute the method shown in FIG. 2. For meanings and examples of the terms in this embodiment, refer to the embodiment corresponding to FIG. 2. Details are not described herein again.

The memory 803 stores program code. The processor 801 is configured to call the program code stored in the memory 803, so as to perform the following operations:

receiving first statistical information sent by a base station, where the first statistical information is statistical information of permission of use of an unlicensed frequency band obtained by means of contention by the base station at a specified time interval;

determining second statistical information of the permission of use of the unlicensed frequency band at the specified time interval according to available indication information sent by the base station, where the second statistical information is statistical information that is obtained by means of statistics collection by the user equipment at the specified time interval and that is of the permission of use of the unlicensed frequency band; and obtaining an RLM result according to the first statistical information and the second statistical information.

In some embodiments of the present invention, the RLM result is a difference between the first statistical information and the second statistical information.

In some embodiments of the present invention, the processor is further configured to:

report the RLM result to the base station when an absolute value of the RLM result is greater than a preset value, so that the base station executes a corresponding cell control policy according to the RLM result.

In some embodiments of the present invention, the second statistical information indicates a quantity of cumulative times that is calculated at the specified time interval and that is of the permission of use of the unlicensed frequency band, and the quantity of cumulative times is a loop count value in an agreed value range; or the second statistical information indicates a cumulative time that is calculated at the specified time interval and that is of the permission of use of the unlicensed frequency band; or the second statistical information indicates information about a ratio of cumulative duration that is calculated at the specified time interval and that is of the permission of use of the unlicensed frequency band to total duration of the specified time interval.

The specified time interval is a periodic time interval, or a time interval from a moment at which the user equipment accesses an unlicensed frequency band cell corresponding to the unlicensed frequency band to a current moment.

In some embodiments of the present invention, the processor is further configured to:

report the RLM result to the base station after the specified time interval ends, so that the base station executes a corresponding cell control policy according to the RLM result.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely preferred embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A base station, comprising:
a processor, configured to contend for a permission to use an unlicensed frequency band; and
a transmitter, configured to send statistical information regarding the permission to use of the unlicensed frequency band to user equipment after the permission to use of the unlicensed frequency band is obtained by contention by the base station, wherein the statistical information indicates data obtained after statistics collection is performed on the permission to use the unlicensed frequency band according to a preset statistical method,
wherein the statistical information indicates a quantity of cumulative times of obtaining the permission to use the unlicensed frequency band by contention from a start moment to a moment of obtaining the permission to use the unlicensed frequency band by contention, and the quantity of cumulative times is a loop count value in an agreed value range;
the statistical information indicates cumulative duration in which the permission to use the unlicensed frequency band is obtained by contention from a start moment to a current moment, and the cumulative duration is a loop count value in an agreed value range; or
the statistical information indicates information about a ratio of cumulative duration in which the permission to use the unlicensed frequency band is obtained by contention from a start moment to the current moment to total duration from the start moment to the current moment, wherein the start moment is a moment at which the base station contends for the permission to use the unlicensed frequency band for a first time, or a start moment of a time interval with an agreed period.

2. The base station according to claim 1, wherein the transmitter is further configured to:

send identification information of the time interval with the agreed period to the user equipment.

3. The base station according to claim 1, wherein the transmitter is further configured to send an available indication message to the user equipment, wherein the available indication message is used to indicate that an unlicensed frequency band cell corresponding to the unlicensed frequency band switches from an unavailable state to an available state, and the available indication message carries the statistical information.

4. The base station according to claim 1, further comprising:

a receiver, configured to: receive an radio link monitoring (RLM) result sent by the user equipment; and instruct, according to the RLM result, the user equipment to stop using an unlicensed frequency band cell.

5. A radio link monitoring method, comprising:

receiving, by user equipment, first statistical information sent by a base station, wherein the first statistical information is statistical information of permission to use an unlicensed frequency band obtained by contention by the base station at a specified time interval, wherein the statistical information indicates a quantity of cumulative times of obtaining the permission to use the unlicensed frequency band by contention within the specified time interval, and the quantity of cumulative times is a loop count value in an agreed value range;

the first statistical information indicates cumulative duration in which the permission to use the unlicensed frequency band is obtained by contention within the specified time interval, and the cumulative duration is a loop count value in an agreed value range; or the first statistical information indicates information about a ratio of cumulative duration in which the permission to use the unlicensed frequency band is obtained by contention within the specified time interval to total duration of the specified time interval;

determining, by the user equipment, second statistical information of the permission to use the unlicensed frequency band at the specified time interval according to available indication information sent by the base station, wherein the second statistical information is statistical information that is obtained by statistics collection by the user equipment at the specified time interval, the statistical information regarding the permission to use the unlicensed frequency band; and obtaining, by the user equipment, an radio link monitoring (RLM) result according to the first statistical information and the second statistical information.

6. The radio link monitoring method according to claim 5, wherein:

the RLM result is a difference between the first statistical information and the second statistical information.

7. The radio link monitoring method according to claim 6, further comprising:

reporting the RLM result to the base station when an absolute value of the RLM result is greater than a preset value, so that the base station executes a corresponding cell control policy according to the RLM result.

8. The radio link monitoring method according to claim 5, wherein:

the second statistical information indicates a quantity of cumulative times that is calculated at the specified time interval, the quantity of cumulative times regarding the permission to use the unlicensed frequency band, and the quantity of cumulative times is a loop count value in an agreed value range;

the second statistical information indicates a cumulative time calculated at the specified time interval regarding the permission to use the unlicensed frequency band; or the second statistical information indicates information about a ratio of cumulative duration calculated at the specified time interval regarding the permission to use the unlicensed frequency band to total duration of the specified time interval, wherein the specified time interval is a periodic time interval, or a time interval from a moment at which the user equipment accesses an unlicensed frequency band cell corresponding to the unlicensed frequency band to a current moment.

9. The radio link monitoring method according to claim 5, further comprising:

reporting the radio link monitoring (RLM) result to the base station after the specified time interval ends, so that the base station executes a corresponding cell control policy according to the RLM result.

10. User equipment, comprising:

a receiver, configured to receive first statistical information sent by a base station, wherein the first statistical information is statistical information of permission to use an unlicensed frequency band obtained by contention by the base station at a specified time interval, wherein the statistical information indicates a quantity of cumulative times of obtaining the permission to use the unlicensed frequency band by contention within the specified time interval, and the quantity of cumulative times is a loop count value in an agreed value range;

the first statistical information indicates cumulative duration in which the permission to use the unlicensed frequency band is obtained by contention within the specified time interval, and the cumulative duration is a loop count value in an agreed value range; or the first statistical information indicates information about a ratio of cumulative duration in which the permission to use the unlicensed frequency band is obtained by contention within the specified time interval to total duration of the specified time interval;

a processor, configured to:

determine second statistical information regarding the permission to use the unlicensed frequency band at the specified time interval according to available indication information sent by the base station, wherein the second statistical information is statistical information obtained by statistics collection by the user equipment at the specified time interval, the second statistical information regarding the permission to use the unlicensed frequency band; and obtain an RLM result according to the first statistical information and the second statistical information.

11. The user equipment according to claim 10, wherein:

the RLM result is a difference between the first statistical information and the second statistical information.

12. The user equipment according to claim 11, further comprising:

a transmitter, configured to report the RLM result to the base station when an absolute value of the RLM result is greater than a preset value, so that the base station executes a corresponding cell control policy according to the RLM result.

13. The user equipment according to claim 10, wherein:

the second statistical information indicates a quantity of cumulative times calculated at the specified time interval regarding the permission to use the unlicensed frequency band, and the quantity of cumulative times is a loop count value in an agreed value range; or the second statistical information indicates a cumulative time that is calculated at the specified time interval and that is of the permission to use the unlicensed frequency band; or the second statistical information indicates information about a ratio of cumulative duration that is calculated at the specified time interval and that is of the permission to use the unlicensed frequency band to total duration of the specified time interval, wherein the specified time interval is a periodic time interval, or a time interval from a moment at which the user equipment accesses an unlicensed frequency band cell corresponding to the unlicensed frequency band to a current moment.

14. The user equipment according to claim 12, wherein the transmitter is further configured to:

report the RLM result to the base station after the specified time interval ends, so that the base station executes a corresponding cell control policy according to the RLM result.

* * * * *